(12) United States Patent
Chen et al.

(10) Patent No.: US 9,317,189 B1
(45) Date of Patent: Apr. 19, 2016

(54) METHOD TO INPUT CONTENT IN A STRUCTURED MANNER WITH REAL-TIME ASSISTANCE AND VALIDATION

(71) Applicant: EMC Corporation, Hopkinton, MA (US)

(72) Inventors: Kai Chen, Shanghai (CN); Ping Chen, Shanghai (CN); Michael John Dutch, Saratoga, CA (US); Bo Chen, Shanghai (CN); Christopher Hercules Claudatos, San Jose, CA (US); Feng Shao, Suzhou (CN)

(73) Assignee: EMC Corporation, Hopkinton, MA (US)

( * ) Notice: Subject to any disclaimer, the term of this patent is extended or adjusted under 35 U.S.C. 154(b) by 170 days.

(21) Appl. No.: 14/136,288

(22) Filed: Dec. 20, 2013

(51) Int. Cl.
*G06F 3/048* (2013.01)
*G06F 3/0484* (2013.01)
*G06F 17/30* (2006.01)
*G06F 17/27* (2006.01)

(52) U.S. Cl.
CPC .......... *G06F 3/0484* (2013.01); *G06F 17/3064* (2013.01); *G06F 17/2725* (2013.01)

(58) Field of Classification Search
None
See application file for complete search history.

(56) References Cited

U.S. PATENT DOCUMENTS

| 2002/0073115 | A1* | 6/2002 | Davis | G06F 17/30882 |
| 2002/0169787 | A1* | 11/2002 | Schiel | G06F 9/541 |
| 2003/0004979 | A1* | 1/2003 | Woodring | G06F 8/30 |
| 2005/0043939 | A1* | 2/2005 | Trower | G06F 3/0237 704/8 |
| 2009/0307220 | A1* | 12/2009 | Bennett | G06F 17/30864 |
| 2012/0297294 | A1* | 11/2012 | Scott | G06F 17/273 715/261 |
| 2013/0226953 | A1* | 8/2013 | Markovich | G06F 17/3064 707/767 |
| 2014/0188926 | A1* | 7/2014 | Chandel | G06F 17/3097 707/767 |

OTHER PUBLICATIONS

Anthony Moore, "Asp Validation in Depth", 2002.*

* cited by examiner

*Primary Examiner* — Jennifer To
*Assistant Examiner* — Beau Spratt
(74) *Attorney, Agent, or Firm* — Van Pelt, Yi & James LLP

(57) ABSTRACT

A user-defined, structured input is received via an element included in a user interface. In real time, an active input from the user-defined, structured input is selected based at least in part on context associated with the user interface. A context-sensitive rule that applies to the active input is determined. Guidance associated with the active input and the context-sensitive rule is provided in real time via the user interface.

12 Claims, 18 Drawing Sheets

METHOD TO INPUT CONTENT IN A STRUCTURED MANNER WITH REAL-TIME ASSISTANCE AND VALIDATION

BACKGROUND OF THE INVENTION

Some user interfaces provide an element (e.g., a text box) which is able to receive a user-defined, structured input comprising some number of inputs where the number of inputs included in the user-defined, structured input is not known by the user interface ahead of time. A command line interface is one example of such an element in a user interface. In one example, the user-defined, structured input "chmod+w file" is received by the command line interface; the user-defined, structured input can be broken down into the three inputs: "chmod," "+w," and "file." That same command line interface could also receive "pwd" (where the user-defined, structured input comprises one input) or "ls-l" (where the user-defined, structured input comprises two inputs). It is not known in advance how many user inputs will be received each time and what those user inputs will be, but some information about the structure is known.

Such elements may be desirable in user interfaces because they take up less screen space (e.g., as opposed to a user interface which provides a text box dedicated for one type of user input, another text box for another user input, and so on). The downside of elements which are configured to receive a user-defined, structured input is that users may find them more difficult to work with, for example because of the rules or structure which governs a user-defined, structured input. New techniques which make such user interface elements easier to work with would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
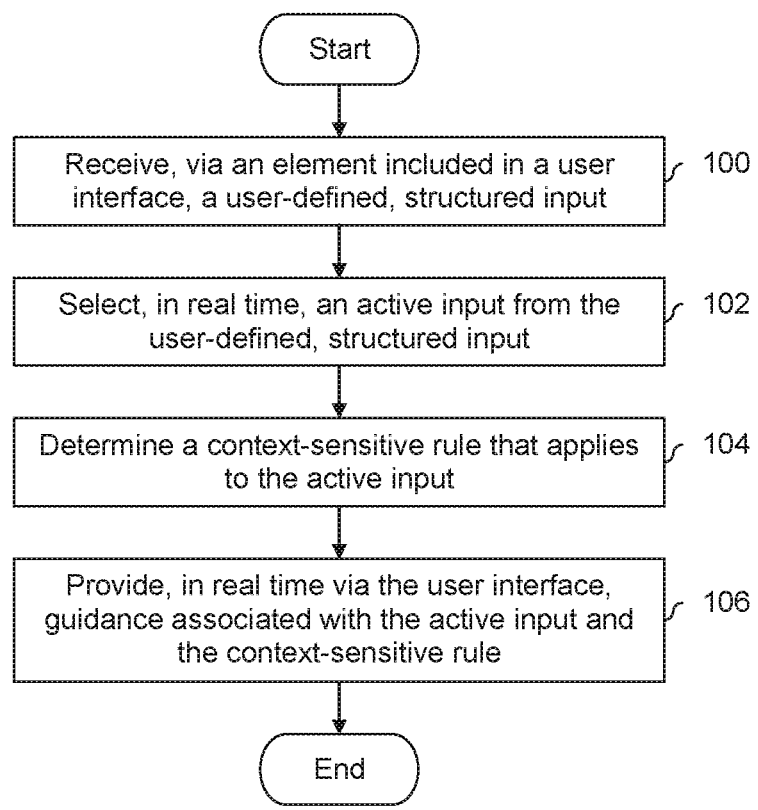
FIG. 1 is a flowchart illustrating an embodiment of a process for providing real-time guidance associated with an active input in a user-defined, structured input and a context-sensitive rule.

FIG. 1 is a flowchart illustrating an embodiment of a process for providing real-time guidance associated with an active input in a user-defined, structured input and a context-sensitive rule. At 100, a user-defined, structured input is received via an element included in a user interface. A user-defined, structured input includes one or more inputs and is user defined in the sense that: (1) the number of inputs comprising the user-defined, structured input are specified by the user and (2) the sequence of inputs within the user-defined, structured input are specified by the user. A user-defined, structured input is structured in the sense that there is some sort of structure associated with the user-defined, structured input. For example, there may be some sort of expected or required structure with respect to sequence of inputs within the user-defined, structured input. For example, it may be expected or required that the first input within the user-defined, structured input be a certain type of input.

In one example, a structured input comprises a triplet of (Column, Operator, Value), where the triplet specifies certain elements within a database which includes columns, each column of which includes values. In this example and other examples described herein, a triplet is associated with a database. For example, if a column called test_scores in a database stores numerical test scores, then the triplet (test_scores, >=, 5) refers to all elements in the column test_scores in the database that are greater than or equal to 5. Or, if a column called family_names in a database stores family names of people, then the structured input (family_names, BEGINS_WITH, 'f') refers to all elements in the column family_names in the database that begin with the letter f. One (exemplary) way that a triplet is a structured is that the triplet is expected to be received in the order (Column, Operator, and Value); a triplet having the sequence (Value, Operator, and Column), as an example, is improper or otherwise violates a sequencing rule. A triplet is one example of an expression; in some embodiments, a user-defined, structured input which is received at step 100 includes an expression.

With a user-defined, structured input, the number of inputs within the user-defined, structured input is not known ahead of time by the user interface. To use the triplet described above as an example, a user interface may receive one triplet or two triplets and so on where triplets are joined together by an operator associated with concatenating triplets. For example, two triplets would be: (Column1, Operator1, Value1) Operator$_{concat}$ (Column2, Operator2, Value2); three triplets would be: (Column1, Operator1, Value1) Operator$_{concat}$1 (Column2, Operator2, Value2) Operator$_{concat}$2 (Column3, Operator3, Value3).

In contrast, some other user interfaces provide dedicated or single-purpose elements (e.g., text boxes, dropdown boxes, radio buttons, etc.). For example, travel booking websites may have one text box for a departure airport/city, another text box for an arrival airport city, another element for the departure month, another element for the departure day, another element for the departure year, and so on. Such user interfaces are not the same as the user interfaces described herein because a given element in those travel booking websites receives a single input, not a user-defined, structured input comprising any number of inputs and having some structure. You cannot, for example, input into one of the text boxes (e.g., the text box for the departure airport/city) the user-defined, structured input: ((departure_airport, SFO) OR (departure_airport, SJC)) AND (arrival_city, SEA). The text box for the departure airport/city can only receive one input and that input has to be for the departure airport/city. A user-defined, structured input is not able to be received through a text box which is dedicated for a single, specific input (e.g., for a departure airport/city).

Also, some other user interfaces provide elements which accept user-specified inputs but not user-specified, structured inputs. For example, some search engine user interfaces provide a textbox with autocomplete. These text boxes offer suggestions for a search query being specified based on previous searches (e.g., by that specific user or other users). Those user interfaces are different from the user interfaces described herein because the search queries being specified are not structured. For example, search queries are not expected to have a certain format or expected sequence of inputs.

At 102, an active input is selected in real time from the user-defined, structured input. As used herein, an active input refers to an input within the user-defined, structured input that is selected, active, eligible to be modified, etc. In some embodiments, an active input is selected at step 102 based on the position of a cursor in a text box. For example, if "|" is used to represent a cursor in a text box, then if a text box in a user interface is showing: "test_scores >=5 AND |" then the column (which has yet to be specified) in the second triplet is selected as the active input because there is a space between the operator associated with concatenating triplets (i.e., AND) and the cursor. Or, if a text box is showing: "test_scores |>=5" (e.g., because the user moved the cursor backwards using a mouse or left arrow keys in order to change the operator) then the operator associated with the first/only triplet is the active input since the cursor is "touching" the operator.

At step 102, selection of the active input occurs in real time. For example, any movement of the cursor (e.g., using a mouse or arrow keys) and/or keystroke (e.g., typing a single letter or number) may trigger step 102 to be performed. This enables guidance to be updated and/or provided in real time at step 106.

At 104, a context-sensitive rule that applies to the active input is determined. A context-sensitive rule is a rule which varies with and/or depends upon context. In some embodiments, the context relates to an already-specified, inactive input (e.g., the already-specified, inactive input affects or triggers some rule which constrains the active input). In some embodiments, the context relates to the structure of the user-defined, structured input and does not necessarily depend upon an already-specified, inactive input. Using the triplet described above as an example, even if nothing has been specified yet for the user-defined, structured input, it is known that the first input in the user-defined, structured input will be a column and certain rules may fall out from that.

In some embodiments, a context-sensitive rule pertains to content (e.g., the rule limits what content is permitted to be specified for the active input). In some embodiments, a context-sensitive rule pertains to format (e.g., the rule specifies what data types (e.g., string, int, and float) may be specified for the active input). More detailed examples of context-sensitive rules and how such context-sensitive rules may be determined are described below.

In some embodiments, determination of a context-sensitive rule at step 104 depends upon an application or usage associated with the user interface. For example, suppose a user interface is associated with specifying symptom data associated with a bug or failure in a database system. In such an application, it is desirable to specify elements in the column that cause a "hit" or can otherwise be found given the specified user-defined, structured input (e.g., when reporting an accident, it is not helpful to report some address that does not exist as the accident location). As such, a context-sensitive rule in that application may be related to ensuring that the specified user-defined, structured input causes a "hit" in the database. In contrast, if a user interface is associated with adding new columns to a database, then it is not necessary to have a context-sensitive rule that ensuring the specified user-defined, structured input causes a "hit" in the database. Since new columns or elements are being added to the database, those new columns or elements naturally will probably not already exist in the database.

At 106, guidance associated with the active input and the context-sensitive rule is provided in real time via the user interface. This guidance is provided in real time, for example so that any movement of the cursor and/or keystroke which is input has the potential to trigger display of new and/or updated guidance.

In some embodiments, the guidance provided at step 106 includes assistance. Assistance refers to guidance that is able to be determined before any information is received for the active input. For example, assistance may be determined and displayed for a column in a first triplet (e.g., a text box shows, "|" where nothing has been specified yet) even though nothing has yet been specified. In some embodiments, the guidance provided at step 106 includes validation. Validation verifies or checks the (at least partially) specified active input and consequently occurs after information begins coming in for the active input. In other words, the dividing line between guidance and validation is when information begins to be specified for the active input. More detailed examples of providing guidance in real time are described below.

In various embodiments, a user-defined structured input received at 100 includes data of various types. For example, a user-defined structured input may include a still image (e.g., a JPEG file), an audio file (e.g., an MP3 file), or a video file (e.g., an MPEG-4 file). A user interface example which receives audio and/or video data is described in further detail below.

Similarly, the guidance provided in real-time at step 106 may comprise a variety of data types. Guidance may include a still image, an audio file, or a video file. Guidance may include "rich" content, for example which uses or includes a CSS style, hyperlink, tooltip, text, picture, audio file, etc.

Figure 2:
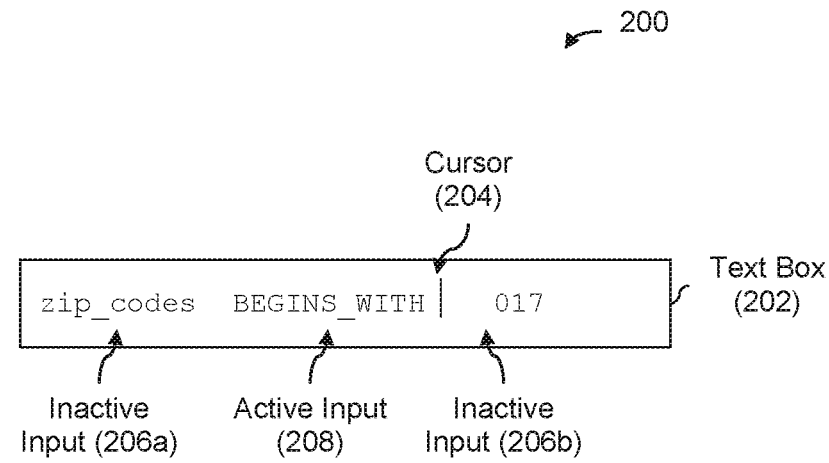
FIG. 2 is a diagram showing various embodiments of an active input.
Figure 2:
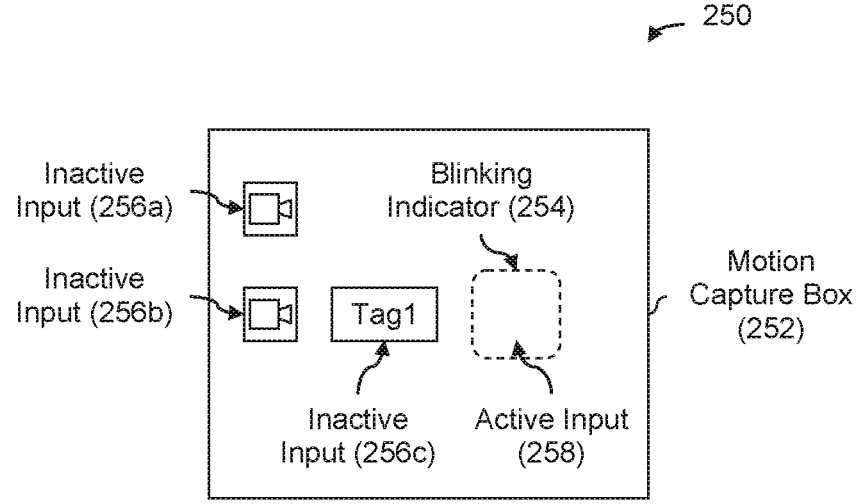

FIG. 2 is a diagram showing various embodiments of an active input. In diagram 200, text box 202 is one example of an element via which a user-defined, structured input (in this example, a triplet) is received. In this example, the position of cursor 204 is used to select an active input at step 102 in FIG. 1. Text box 202 shows "zip_codes BEGINS_WITH|017" where "|" is the cursor. Since cursor 204 is touching the second input (i.e., BEGINS_WITH), that input is selected to be the active input (208). The first input zip_codes (206a) and the second input 017 (206b) are inactive inputs since they are not touching the cursor.

In diagram 250, a motion capture box (252) is shown. Motion capture box 252 is one example of an element via which a user-defined, structured input is received. A motion capture system uses voice commands and/or motion commands to interact with a user interface. Instead of (for example) using a keyboard and a mouse to interact with a user interface, a video camera is used to input, select, and manipulate information shown in motion capture box 252. In this example, a video recording and associated tags (if any) are organized by row. More specifically, things in the same row are related or associated and something on one row is not associated with something on another row. In this diagram, video input 256a has no tags associated with it (since it is alone on the first row), but video input 256b has tag 256c associated with it (since both video input 256b and tag 256c are both on the second row).

In the example of diagram 250, the position of a blinking indicator 254 (or, more generally, a visual indicator) is used to select the active input. Blinking indicator 254 may be used to indicate to the user which input is selected and/or (if desired) can be manipulated (e.g., deleted, moved, and/or edited) using the appropriate voice (e.g., saying "delete") and/or motion command (e.g., making a diagonal, slashing motion). The other inputs (i.e., 256a, 256b, and 256c) are inactive inputs. Since blinking indicator 254 is located at the end of the second row (i.e., without surrounding either input 256b or 256c), a second tag (not yet specified) associated with the second video (i.e., 256b) is selected as the active input. If the blinking indicator were instead located in the third row (e.g., with nothing else in that row), then a third video (not yet specified) would be selected as the active input. In some other embodiments, some other type of visual indicator may be used, such as highlighted text (e.g., using a text color of a different color compared to inactive inputs). As is shown in this figure, in some embodiments selection of an active input is based on a position of a cursor (or, more generally, some visual indicator).

Figure 3:
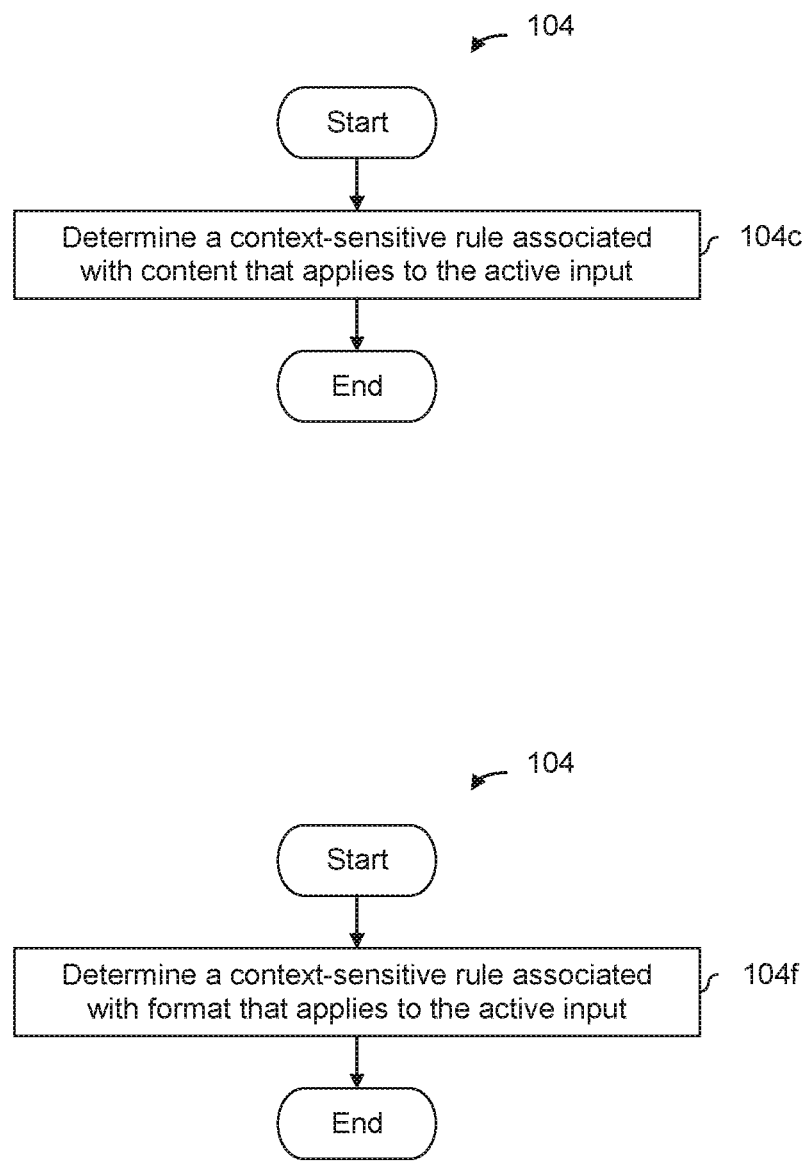
FIG. 3 is a diagram showing various embodiments for determining a context-sensitive rule.

FIG. 3 is a diagram showing various embodiments for determining a context-sensitive rule. In some embodiments, one or more of the processes described herein is/are used to perform step 104 in FIG. 1.

In some embodiments, at step 104 in FIG. 1, a context-sensitive rule associated with content that applies to the active input is determined. This is referred herein as step 104c, where the "c" stands for content.

To illustrate an example of a context-sensitive rule associated with content, consider a user interface associated with selecting elements in a database that includes two columns. One column stores zip codes (e.g., 01748 or 01748-2209) and the other column stores states in their 2-letter abbreviated form per the United States Postal Service (USPS) (e.g., "MA" for Massachusetts). A context-sensitive rule associated with content may require that an active input associated with a zip code must match a legitimate or proper zip code (e.g., recognized by the USPS) stored by the database and/or or that an active input associated with a state must match a legitimate or proper 2-letter state code stored in the database. For example, "00000" would not be stored by the zip code column (e.g., because it is not a proper zip code and thus would not be stored by the database) and "AA" would not be stored by the state column (e.g., because it is not an official abbreviation for a state and thus would not be stored by the database).

In some embodiments, at step 104 in FIG. 1, a context-sensitive rule associated with format that applies to the active input is determined. This is referred herein as step 104f, where the "f" stands for format.

To illustrate an example of a context-sensitive rule associated with format, let us continue the example from above. In one example context-sensitive rule associated with format, it is a rule that an active input associated with zip code has a format of either 5 numerical digits (e.g., _ _ _ _ _ where each place is filled by a numerical digit) or a format of 5 numerical digits, a dash, and 4 numerical digits (e.g., _ _ _ _ _-_ _ _ _ where each place is filled by a numerical digital). Note that the exemplary context-sensitive rule associated with format does not check if the specified value(s) matches a zip code stored by the database. For example, 00000 would pass a check associated with a context-sensitive rule associated with format (e.g., because the format of 5 numerical digitals is proper or correct), but would not pass a check associated with a context-sensitive rule associated with content (e.g., because 00000 is not a valid zip code recognized by the USPS and thus would not be stored by the database). Similarly, Z_(i.e., "Z" has been specified as the first letter and the second letter has yet to be specified) would pass a context-sensitive rule associated with format (e.g., because the format, so far, is proper because a letter has been specified), but would not pass a context-sensitive rule associated with content (e.g., because there is no valid two-letter state abbreviation recognized by the USPS which begins with Z and thus that zip code would not be stored by the database).

Figure 4:
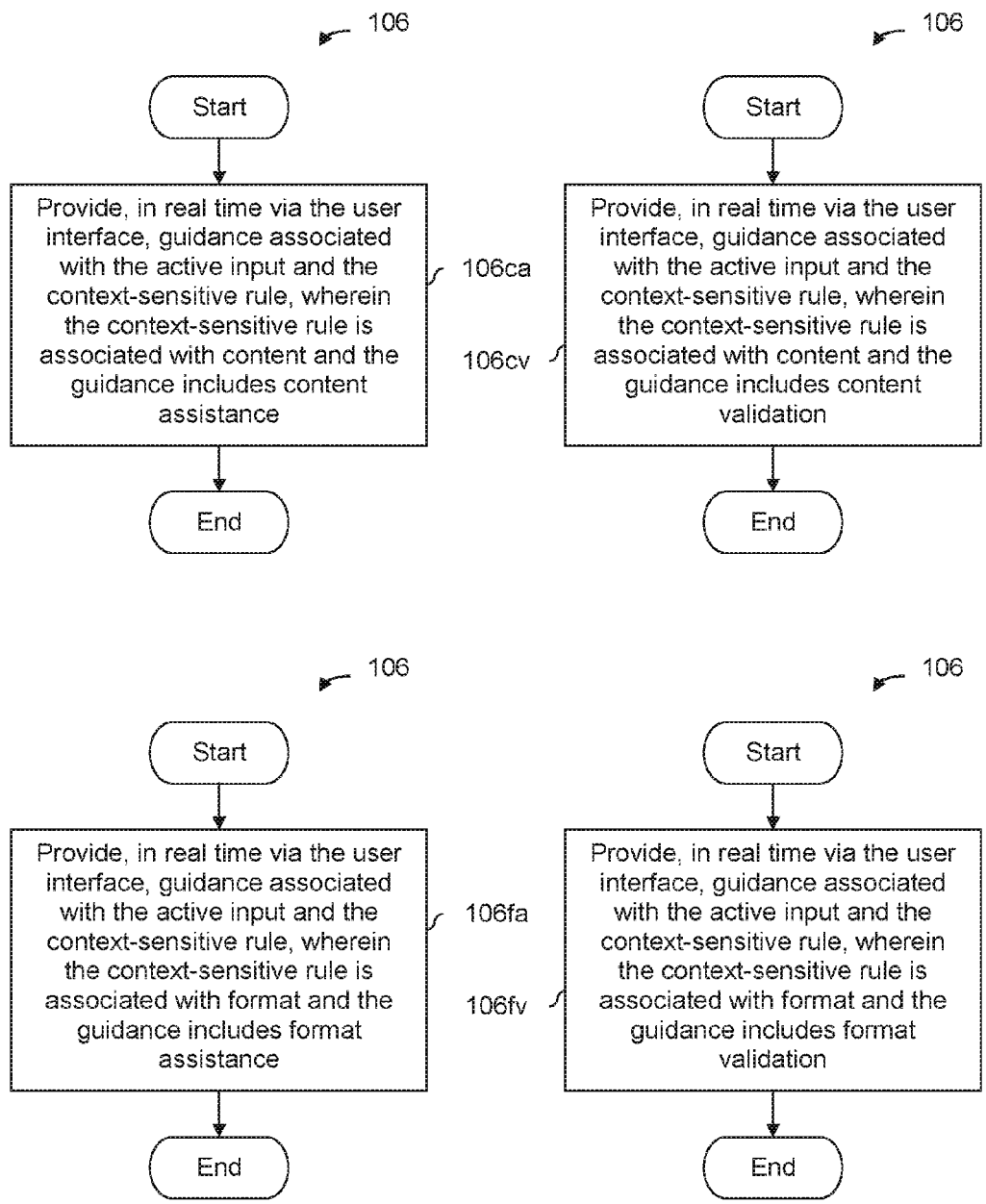
FIG. 4 is a diagram showing various embodiments for providing guidance in real time.

FIG. 4 is a diagram showing various embodiments for providing guidance in real time. In some embodiments, one or more of the processes described herein is/are used to perform step 106 in FIG. 1.

In some embodiments, guidance associated with the active input and the context-sensitive rule is provided in real time via the user interface, wherein the context-sensitive rule is associated with content and the guidance includes content assistance. This is referred herein as step 106ca, where the "c" stands for content and the "a" stands for assistance. As described above, assistance is able to be determined before any information is received for the active input.

In some embodiments, guidance associated with the active input and the context-sensitive rule is provided in real time via the user interface, wherein the context-sensitive rule is associated with content and the guidance includes content validation. This is referred herein as step 106cv, where the "c" stands for content and the "v" stands for validation. As described above, validation uses or is based on at least partially-specified information for the active input and as such the determination at step 106cv occurs after at least some information is received for the active input.

In some embodiments, guidance associated with the active input and the context-sensitive rule is provided in real time via the user interface, wherein the context-sensitive rule is associated with format and the guidance includes format assistance. This is referred herein as step 106fa, where the "f" stands for format and the "a" stands for assistance.

In some embodiments, guidance associated with the active input and the context-sensitive rule is provided in real time via the user interface, wherein the context-sensitive rule is associated with format and the guidance includes format validation. This is referred herein as step 106fv, where the "f" stands for format and the "v" stands for verification.

The following figures show various examples of step 106ca, step 106cv, step 106fa, and step 106fv.

Figure 5:
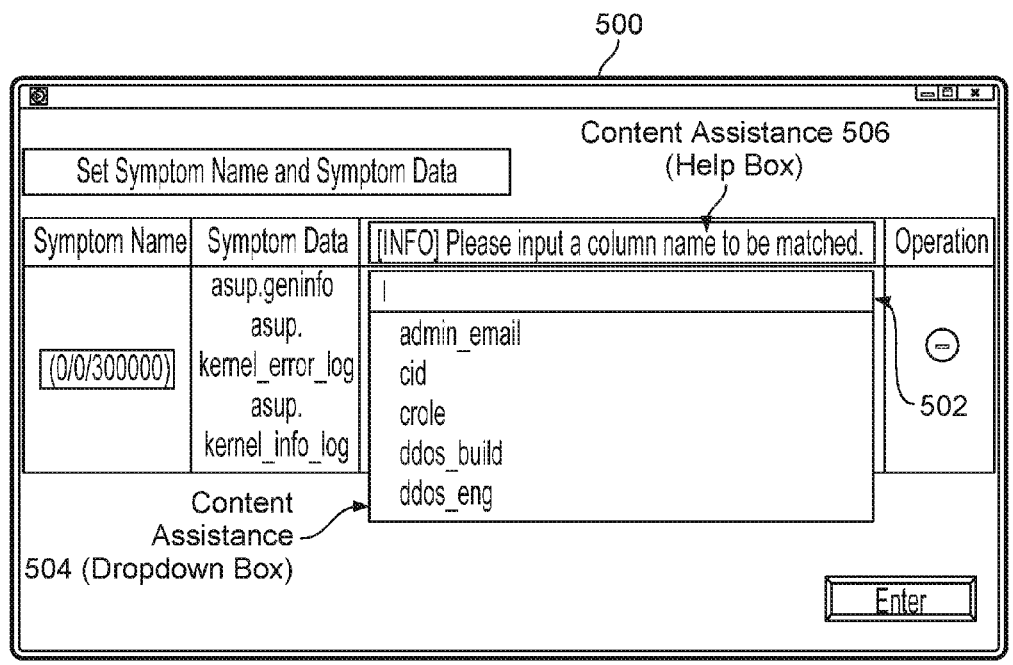
FIG. 5 is a diagram showing an embodiment of a user interface which is configured to display, in real time, content assistance associated with a column.
Figure 5:
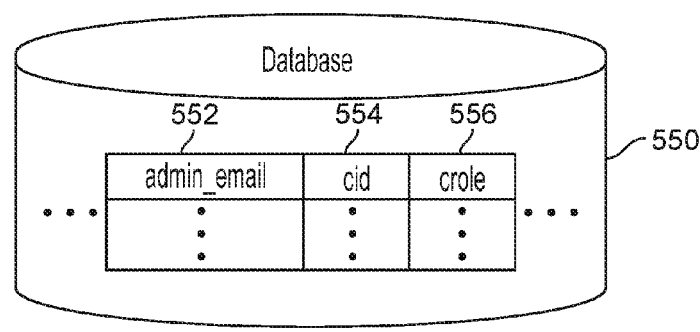

FIG. 5 is a diagram showing an embodiment of a user interface which is configured to display, in real time, content assistance associated with a column. In this example and the following figures, the user interfaces shown are associated with specifying symptom data associated with bug definitions stored in a database system. For the reasons described above, it is desirable for the user-defined, structured inputs specified in the following examples to cause a "hit" in the associated database.

In the example shown, text box 502 is used (e.g., by a user) to specify symptom data associated with a bug in database 550. In examples described herein, a bug is any condition that may be remediated. In some cases a bug may be a failure or be related to a failure but in many cases it is not. The information stored in a database used to identify a bug is collectively referred to as a bug definition. As in some examples described above, user interface 500 is expecting one or more triplets where each triplet comprises (Column, Operator, Value) (in that order) and triplets are joined together (if there are multiple triplets) by an operator associated with concatenating triplets.

At the point in time shown, information has yet to be entered in text box 502. Note, for example, that text box 502 shows a cursor (i.e., "|") but nothing else. Although no information has been entered yet in text box 502, content assistance may be displayed.

In this example, content assistance 504 includes a dropdown box which lists the names of all columns in database 550. Note, for example, that database 550 includes admin_email column 552, cid column 554, and crole column 556, all of which are included in dropdown box 504. In some embodiments, a dropdown box is generated on-the-fly or in real time, so that changes in database 550 can be detected or picked up immediately by user interface 500 (e.g., a newly created column is immediately detected and displayed in dropdown box 504). More generally, dropdown box 504 may be described as a list of permitted values for the active input.

User interface 500 also displays content assistance in the form of a help box (506). Help box 506 appears above text box 502 and says, "[INFO] Please input a column name to be matched."

Figure 6:
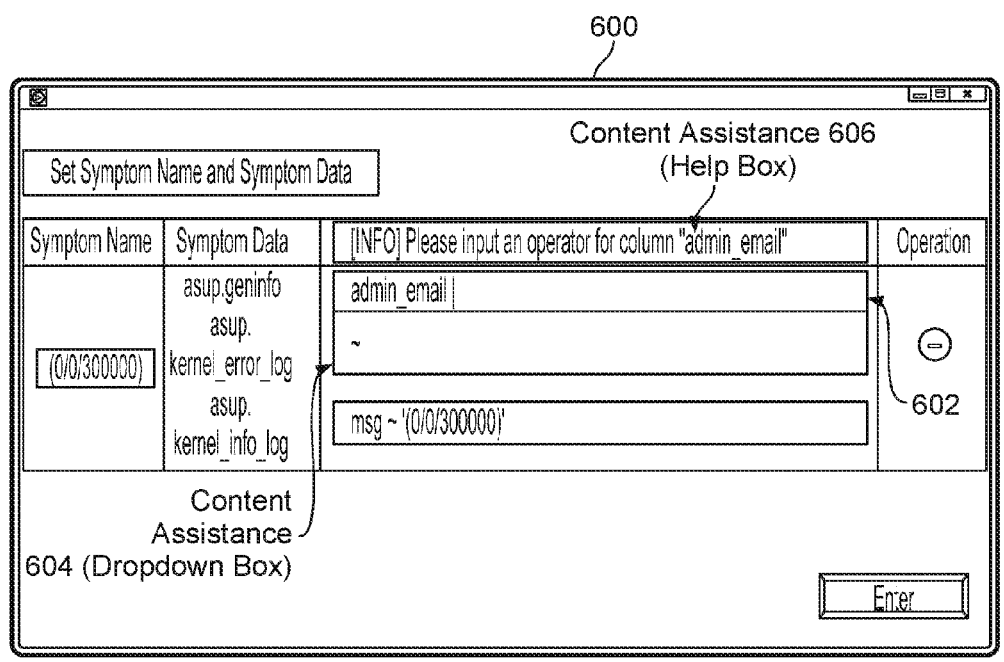
FIG. 6 is a diagram showing an embodiment of a user interface which is configured to display, in real time, content assistance associated with an operator.

FIG. 6 is a diagram showing an embodiment of a user interface which is configured to display, in real time, content assistance associated with an operator. FIG. 6 continues the example shown in FIG. 5. At the point in time shown here, text box 602 has one input specified (i.e., the column admin_email) and a second input (e.g., an operator in the same triplet) is in the process of being input. In one example, the user selected "admin_email" from dropdown box 504 in FIG. 5 to cause text box 602 to get to the state shown here.

In real time (e.g., as soon as the user has selected the column "admin_email" from a dropdown box), dropdown box 604 and help box 606 are displayed with new information. Dropdown box 604 now lists the operator "~" and help box 606 says, "[INFO] Please input an operator for column "admin_email." For example, the admin_email column may include values with a data type of "regular expression" or "string" and thus the normal expression operator "~" is the only permitted operator for the admin_email column. In some embodiments, a regular expression is a sequence of characters associated with a search pattern where the search pattern is oftentimes used in string matching. In contrast, Boolean operators (as an example) such as AND or OR may not make sense when compared against a normal expression.

Figure 7:
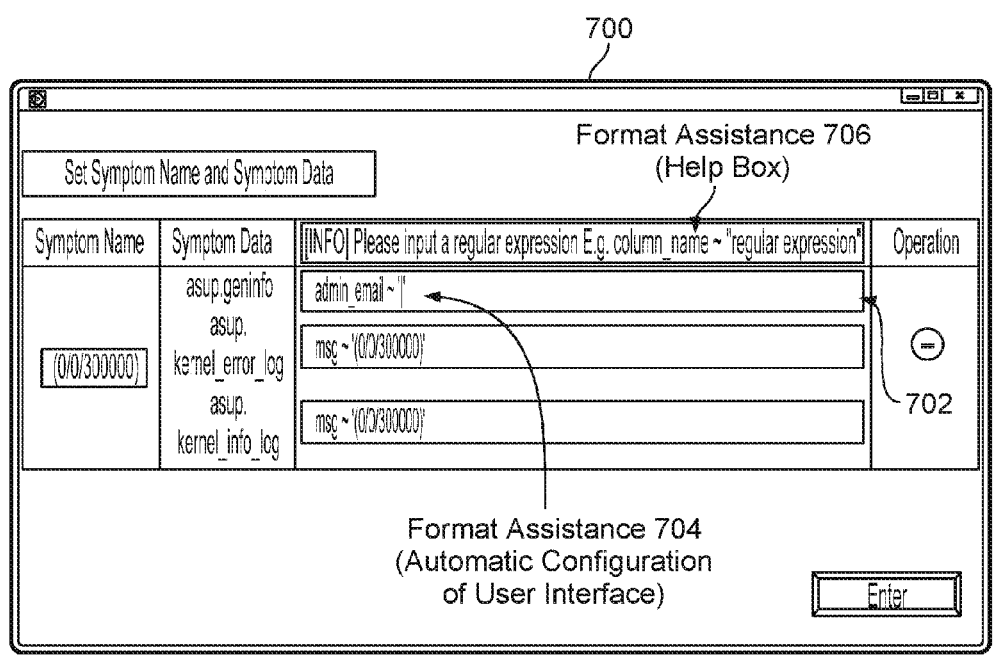
FIG. 7 is a diagram showing an embodiment of a user interface which is configured to display, in real-time, format assistance associated with a value.

FIG. 7 is a diagram showing an embodiment of a user interface which is configured to display, in real-time, format assistance associated with a value. FIG. 7 continues the example of FIG. 6. At the point in time shown, text box 702 is showing "admin_email ~'|'" where "|" indicates the cursor. The first input in the triplet is the column admin_email, the second user input is the operator ~ and the third input (in this example, a value to complete the triplet) has yet to be specified.

In real time (e.g., as soon as the user has selected the operator "~" from the dropdown box or typed in "~" from a keyboard), text box 702 and help box 706 are updated with new information. Format assistance 704 includes automatically configuring the user interface, specifically by automatically populating text box 702 with single quotation marks (i.e., 'and') and placing the cursor between the two quotation marks so that the user input is in the proper format (e.g., a "string" format or a "regular expression" format).

Help box 706 is also updated in real time and now says, "[INFO] Please input a regular expression. E.g., column_name ~'regular expression'." Note that help box 706 includes assistance as to how to properly format the active input (e.g., single quotes are required for this particular active input in order to satisfy format requirements). Note, for example, that single quotation marks are also included in the message in help box 706.

Figure 8:
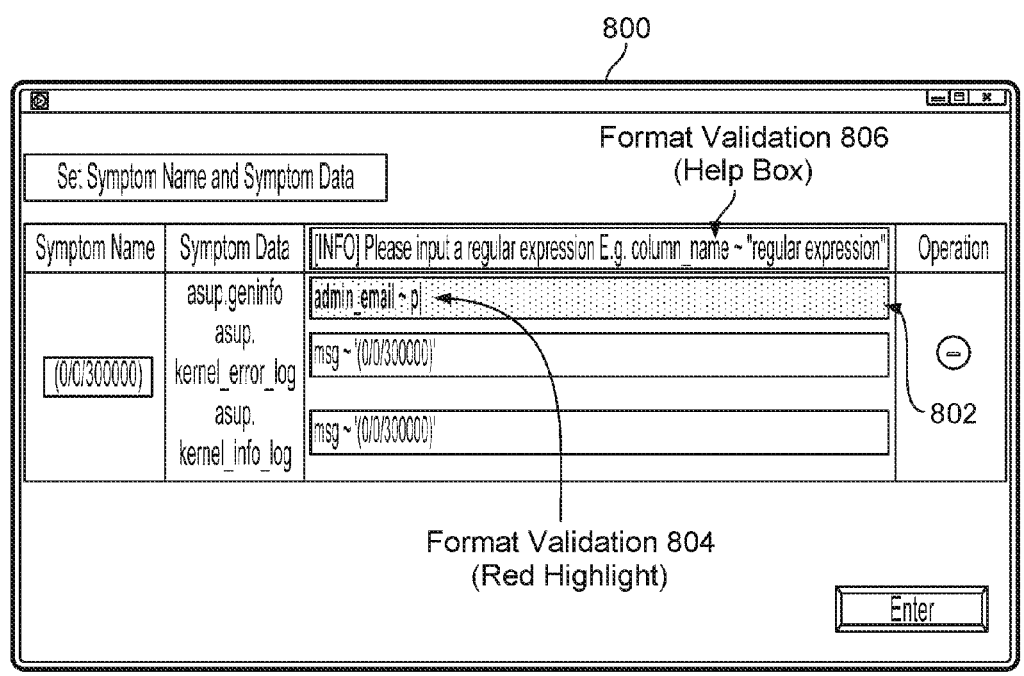
FIG. 8 is a diagram showing an embodiment of a user interface which is configured to display, in real-time, format validation associated with a value.

FIG. 8 is a diagram showing an embodiment of a user interface which is configured to display, in real-time, format validation associated with a value. FIG. 8 continues the example of FIG. 7. In the example shown, text box 802 shows "admin_email ~p|". Although one or more email addresses which begin with p may, in fact, be stored in a database, the format of the email address (which is the active input) is not proper (e.g., the email address needs to begin and end with single quotes so that it is properly typed or recognized as a regular expression).

In this example, format validation includes a help box (806) which is updated in real time (e.g., as soon as the user types in "p" without a single quotation mark before it), to say, "[INFO] Please input a regular expression. E.g., column_name ~'regular expression'." Format validation in this example also includes a red highlight (804) which text box 802 is updated in real time with. The red highlight will go away once the format rule has been properly addressed (e.g., once beginning and ending single quotation marks have been added).

In some embodiments where two or more context-sensitive rules (relevant to the active input) are being violated at the same time, a user interface stays with some currently-displayed guidance until the associated rule is resolved. For example, suppose the user types in the letter r so that text box 802 shows "admin_email ~ pr|" where there is no email address in the database which begins with pr. As such, a context-sensitive rule associated with content is now being violated, in addition to the context-sensitive rule associated with format which was and still is being violated. In some embodiments, user interface 800 maintains help box 806 and red highlight 804 even though a context-sensitive rule associated with content is also being violated. It may be undesirable for a user interface to excessively flip-flop and user interface 800 is less frenetic if it maintains help box 806 and red highlight 804 until the context-sensitive rule associated with format is resolved. At that point (in this embodiment at least), guidance associated with the context-sensitive rule associated with content is displayed.

Figure 9:
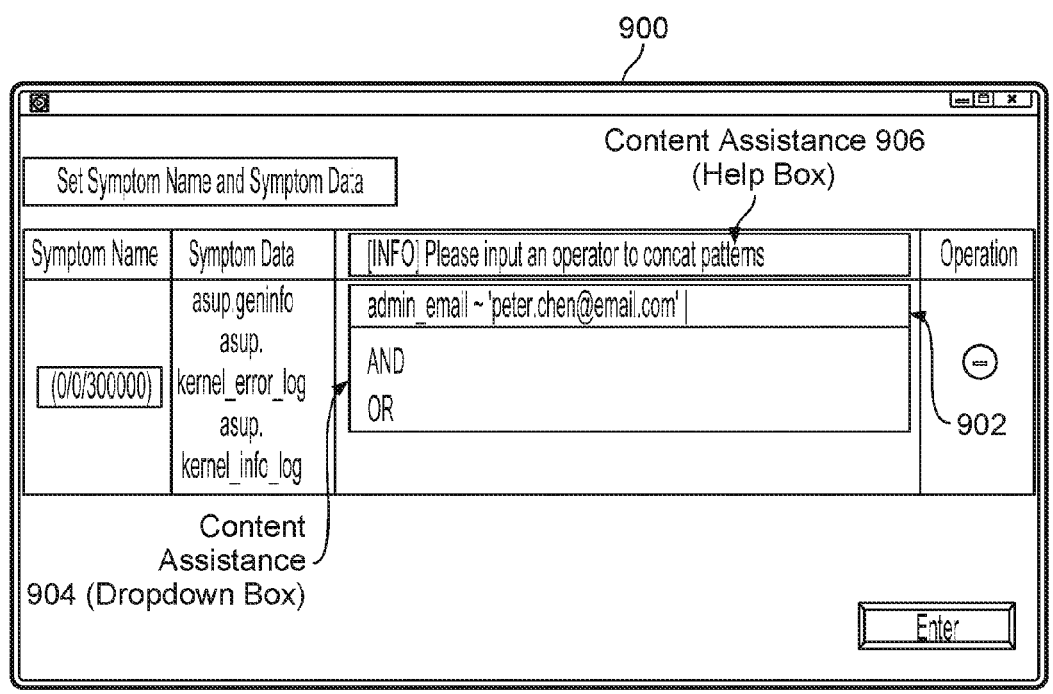
FIG. 9 is a diagram showing an embodiment of a user interface which is configured to display, in real-time, content assistance associated with an operator associated with concatenating triplets.

FIG. 9 is a diagram showing an embodiment of a user interface which is configured to display, in real-time, content assistance associated with an operator associated with concatenating triplets. FIG. 9 continues the example of FIG. 8. In the example shown, text box 902 shows "admin_email ~'peter.chen@email.com' |". Based on the position of the cursor, an operator associated with concatenating triplets is selected to be the active input and so dropdown box 904 is displayed in real time (e.g., as soon as a space character is entered after 'peter.chen@email.com') with all possible operator associated with concatenating triplets, in this case the Boolean operators AND and OR. Help box 906 is updated in real time to show "[INFO] Please input an operator to concat patterns."

Note that the context-sensitive rule associated with content in this example does not depend upon the already-specified, inactive inputs associated with the first triplet. For example, the first triplet could be (Column1, Operator1, Value1) or (Column2, Operator2, Value2) and help box 906 and dropdown box 904 would still be the same. Some examples of this are described in further detail below.

Figure 10:
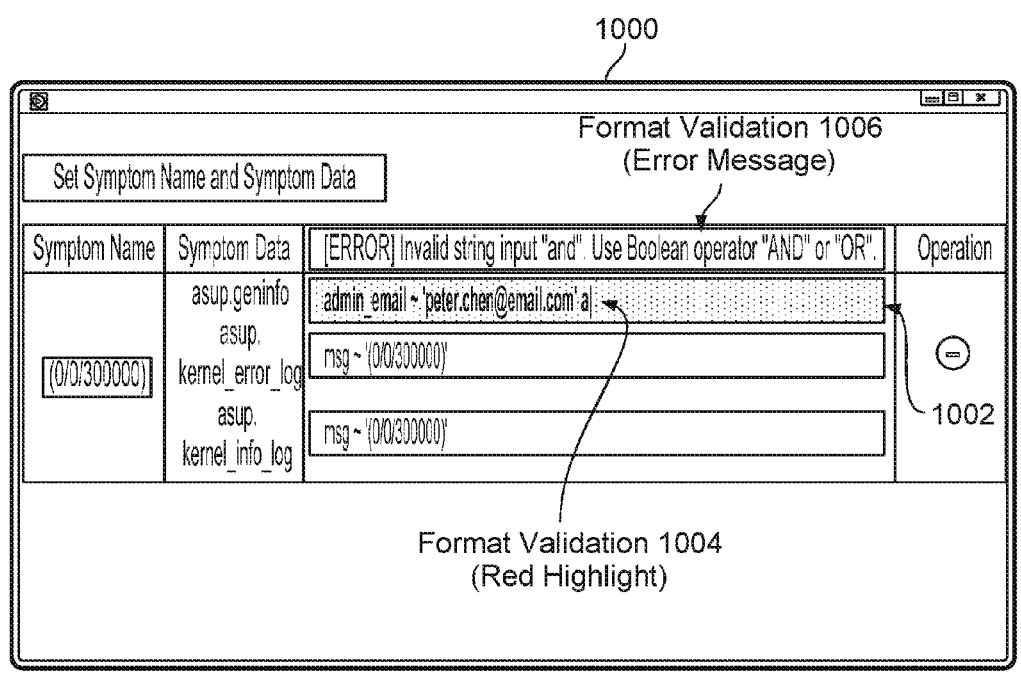
FIG. 10 is a diagram showing an embodiment of a user interface which is configured to display, in real-time, format validation associated with an operator associated with concatenating triplets.

FIG. 10 is a diagram showing an embodiment of a user interface which is configured to display, in real-time, format validation associated with an operator associated with concatenating triplets. FIG. 10 continues the example of FIG. 9. In the example shown, text box 1002 shows "admin_email ~'peter.chen@email.com' a|". Although the Boolean operator AND is an acceptable operator associated with concatenating triplets that begins with the letter a, in order for an operator associated with concatenating triplets to be recognized or typed as a Boolean operator, the operator associated with concatenating triplets must be in all caps form. As such, error message 1006 is updated in real time (e.g., as soon as the lower case letter "a" is entered) to say "[ERROR] Invalid string input "and". Use Boolean operator "AND" or "OR"." Red highlight 1004 is also applied in real time to text box 1002.

Figure 11:
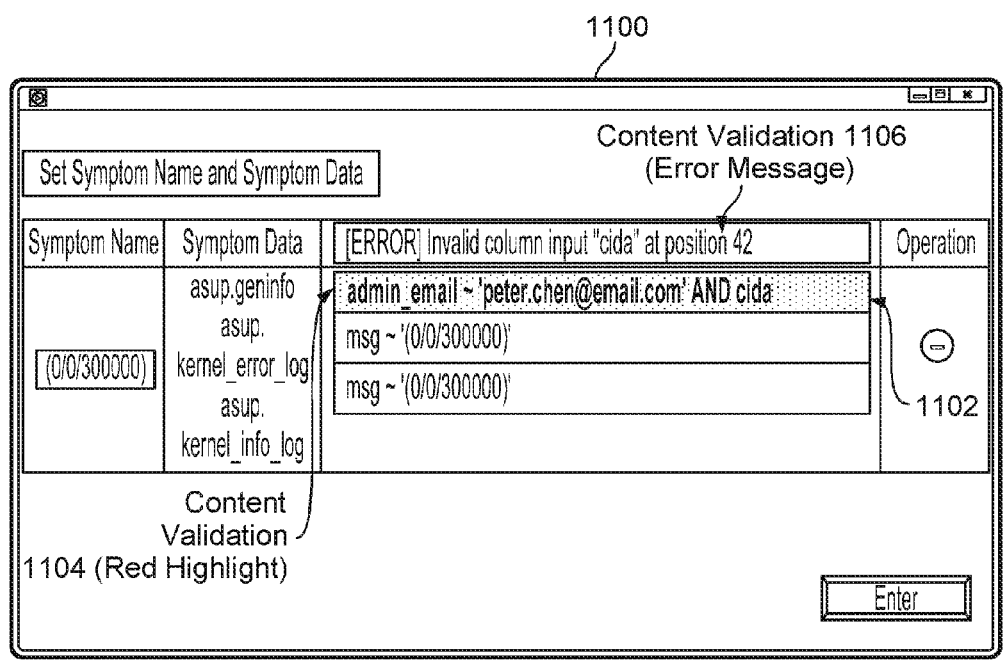
FIG. 11 is a diagram showing an embodiment of a user interface which is configured to display, in real-time, content validation associated with a column.

FIG. 11 is a diagram showing an embodiment of a user interface which is configured to display, in real-time, content validation associated with a column. FIG. 11 continues the example of FIG. 10. In the example shown, text box 1102 shows, "admin_email ~'peter.chen@email.com' AND cida|". There is no column named cida in an associated database (see, e.g., database 550 in FIG. 5), so the specified value for the column of the second triplet does not pass a context-sensitive rule associated with content (i.e., that the specified name for a column must be stored in the associated database). As such, error message 1106 is displayed in real time which says "[ERROR] Invalid column input "cida" at position 42." For example, as soon as the "a" in "cida" is entered, error message 1106 is displayed. Also, red highlight 1104 is displayed in real time in text box 1102.

Figure 12:
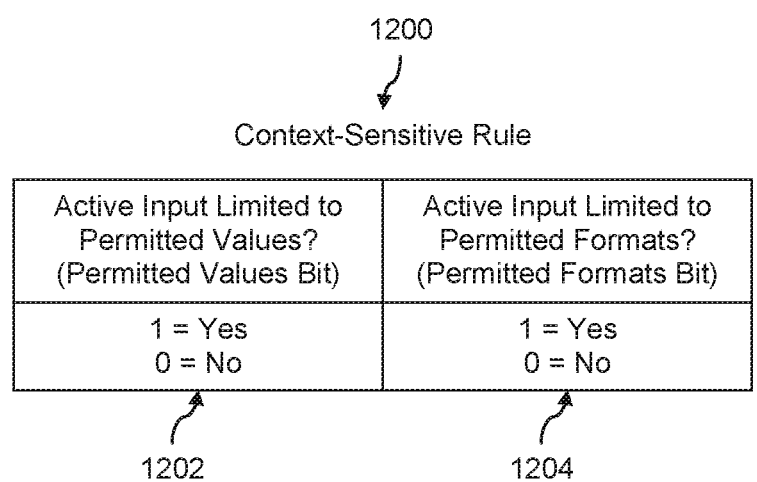
FIG. 12 is a diagram illustrating an embodiment of a context-sensitive rule which includes a bitmap.

FIG. 12 is a diagram illustrating an embodiment of a context-sensitive rule which includes a bitmap. In the example shown, context-sensitive rule 1200 includes two bits: permitted values bit 1202 and permitted formats bit 1204.

Permitted values bit 1202 is used to track if an active input is limited to certain permitted values. If bit 1202 is set to 1, then the active input is so limited. If bit 1202 is set to 0, then the active input is not limited to certain permitted values. For example, if the value field in a triplet is the active input, then there may be an expectation or requirement that the specified value (e.g., about to be specified or in the middle of being specified) be stored within some database in the column specified in the same triplet (e.g., in FIG. 5, if the column admin_email 552 is specified in a triplet then it is expected that a value specified in the same triplet be a value which is stored in column 552 in database 550).

Similarly, permitted formats bit 1204 is used to track if an active input is limited to certain permitted formats. For example, suppose that the active value is expected to be a zip code having a format of either 5 numerical digits (e.g., _ _ _ _ _) or 5 numerical digits, followed by a dash, followed by 4 numerical digits (e.g., _ _ _ _ _-_ _ _ _). In this example, since there is an expectation of a certain format, bit 1204 is set to 1. If the active input is not limited to certain permitted formats, then bit 1204 is set to 0.

In some embodiments, determining a context-sensitive rule at step 104 in FIG. 1 includes setting bit 1202 and/or bit 1204. In some embodiments, determination of the actual permitted value(s) and/or actual permitted format(s) to which the active input is limited is performed at step 106 in FIG. 1 (e.g., if the corresponding bit 1202 or 1204 is set).

Figure 13A:
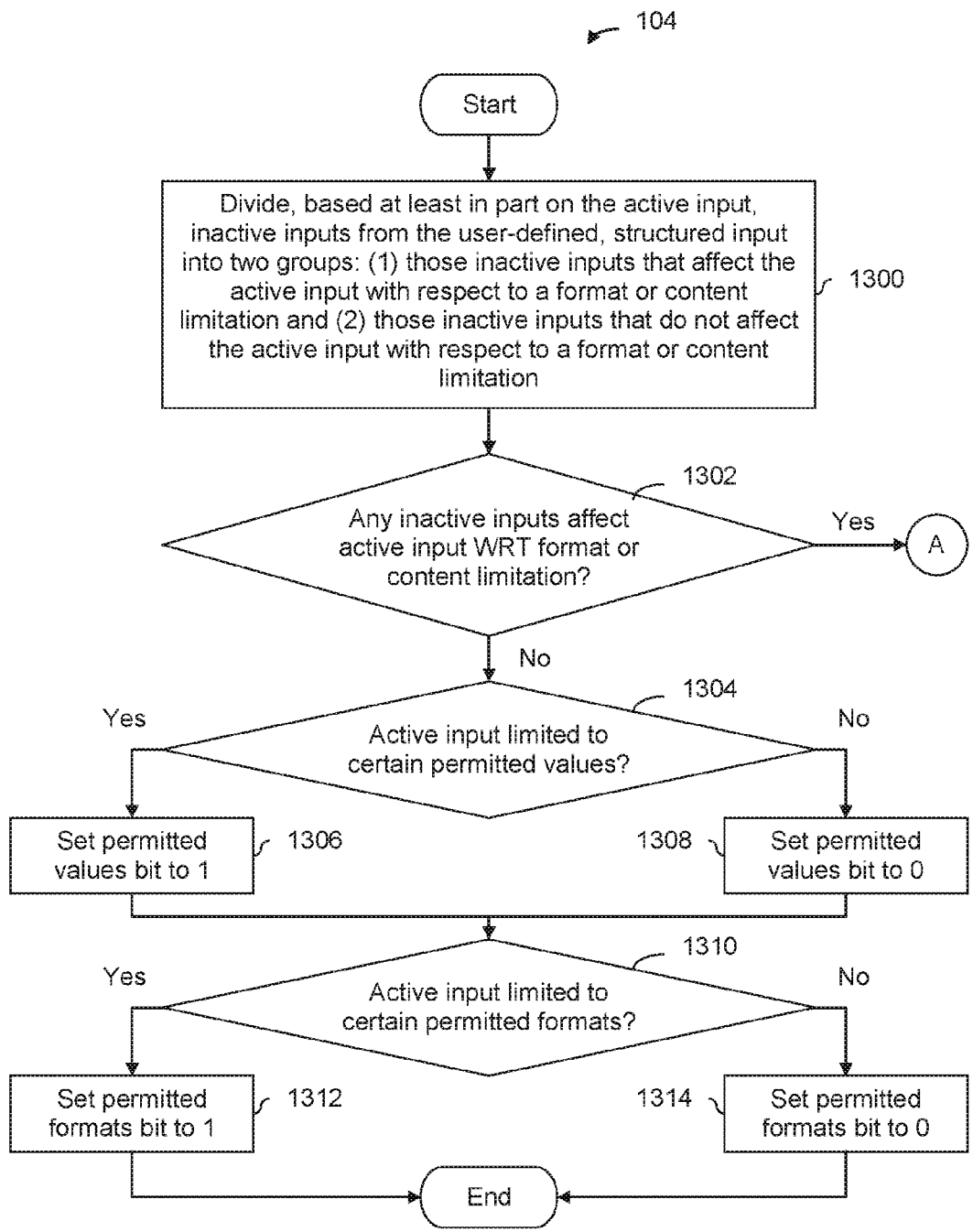
FIG. 13A is a flowchart illustrating an embodiment of a first portion of a process for setting a permitted values bit and a permitted format bit associated with a context-sensitive rule.
Figure 13B:
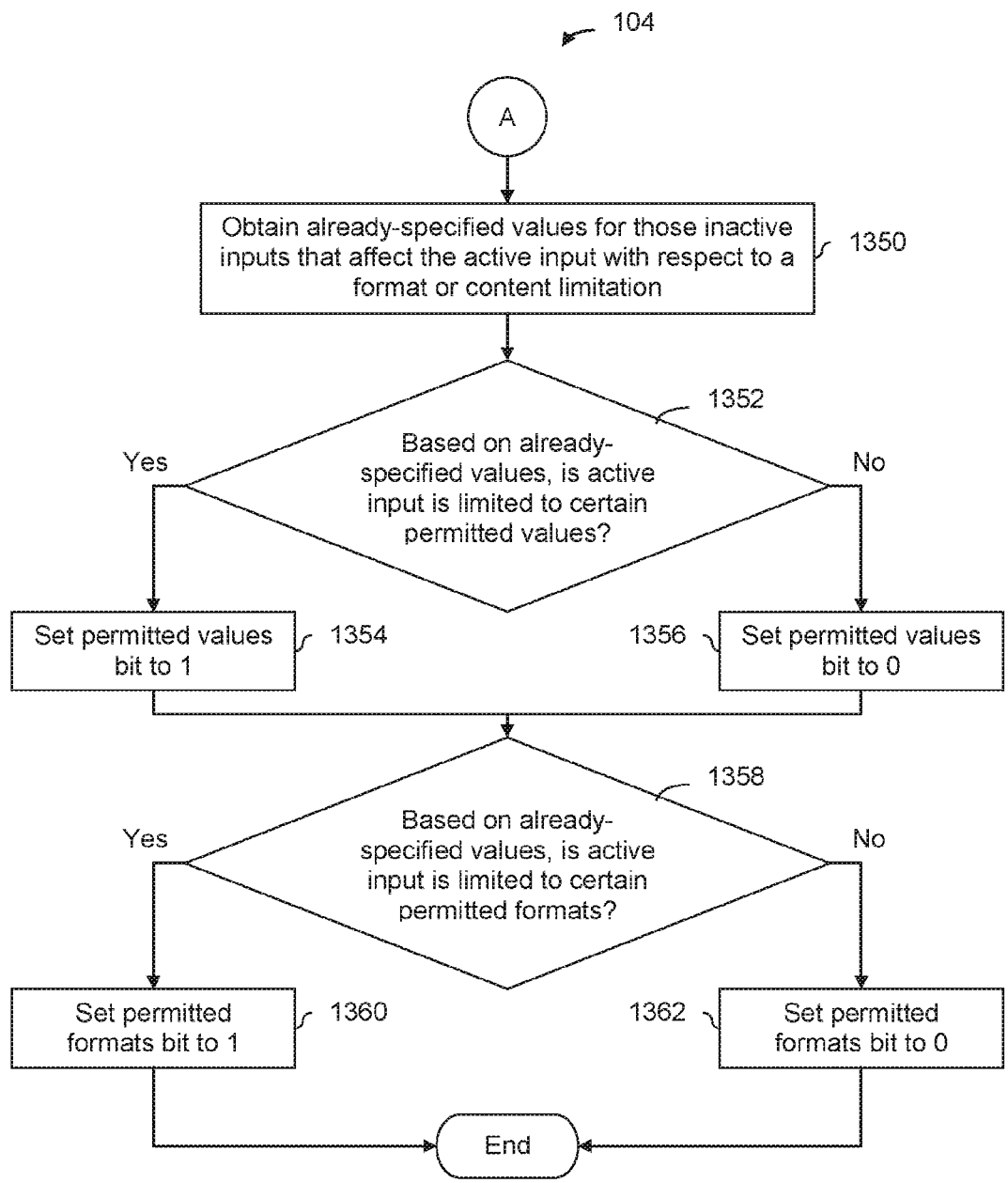
FIG. 13B is a flowchart illustrating an embodiment of a second portion of a process for setting a permitted values bit and a permitted format bit associated with a context-sensitive rule.

FIGS. 13A and 13B are a flowchart illustrating an embodiment of a process for setting a permitted values bit and a permitted format bit associated with a context-sensitive rule. For example, the example process may be used to set bits 1202 and 1204 in FIG. 12. In some embodiments, the process is used at step 104 in FIG. 1.

At 1300, inactive inputs from the user-defined, structured input are divided, based at least in part on the active input, into two groups: (1) those inactive inputs that affect the active input with respect to a format or content limitation and (2) those inactive inputs that do not affect the active input with respect to a format or content limitation. An inactive input is any input in the user-defined, structured input which is not the active input. Table 1 shows an example of step 1300 perform on various user-defined, structured inputs for various active inputs.

TABLE 1

Example user-defined, structured inputs processed according to step 1300 in FIG. 13A.

| User-defined, structured input (active input underlined) | Inactive inputs that affect the active input (step 1300) | Inactive inputs that do not affect the active input (step 1300) |
| --- | --- | --- |
| (Column) | None | None |
| admin_email (Operator) | admin_email | None |
| admin_email~ 'peter.chen@email.com' (Operator Associated With Concatenating Triplets) | None | admin_email~ 'peter.chen@email.com' |

For the first row in Table 1, there are no inactive inputs, so nothing would be classified as either the first group (i.e., those inactive inputs that affect the active input with respect to the context-sensitive rule) or the second group (i.e., those inactive inputs that do not affect the active input with respect to the context-sensitive rule).

For the second row in Table 1, specification of admin_email as the column in the triplet limits the operator that can be specified in combination with the admin_email column to certain operators (e.g., only the operator ~ can be used in combination with the column admin_email). As such, the inactive input "admin_email" is grouped into the first group.

For the third row in Table 1, none of the already-specified inactive inputs limit or restrict the active input (which in this case is operator associated with concatenating triplets). For example, if the first triplet were (Column1, Operator1, Value1), any rules or expectations for the subsequent operator associated with concatenating triplets would be the same as if another triplet (such as ( ) were used instead. As such, the inactive inputs associated with the first triplet do not affect the operator associated with concatenating triplets/active input.

As illustrated by the third row in Table 1, at least some of the user interface embodiments described herein are different from user interfaces with autocomplete. In autocomplete, all of the entered information is considered and/or used by the autocomplete process. To put it another way, user inputs entered into a text box with autocomplete do not (example) fall into two classes: those inactive inputs that affect the active input with respect to a format or content limitation and those inactive inputs that do not affect the active input with respect to a format or content limitation. As such, there is no need for those other user interfaces to perform step 1300.

At 1302, it is determined if there are any inactive inputs that affect the active input with respect to a format or content limitation. For example, if the middle column in Table 1 is "None" then the decision at 1302 is No. If there is at least one inactive input in the middle column in Table 1, then the decision at 1302 is Yes.

If it is determined at 1302 that none of the inactive inputs affect the active input with respect to a format or content limitation, then at 1304 it is determined if the active input is limited to certain permitted values. If so, a permitted values bit is set to 1 at 1306. Consider, for example, the first and third rows in Table 1. In both of those examples, there is no inactive input that affects the active input with respect to a content or format limitation, but there still may be an expectation that the entered column be stored by an associated database. If not, the permitted values bit is set to 0 at 1308.

After setting the permitted values bit to the appropriate value at step 1306 or step 1308, it is determined at 1310 if the active input is limited to certain permitted formats. If so, a permitted formats bit is set to 1 at 1312. In FIG. 8, for example, there is formatting expectation for single quotation marks (e.g., so that the specified value is properly typed or interpreted as a regular expression) and in FIG. 10 the operator associated with concatenating triplets is expected to be in all caps (e.g., so that the specified operator associated with concatenating triplets is properly typed or interpreted as an operator). If not, the permitted formats bit is set to 0 at 1314.

Note that none of the inactive inputs affect the decision at 1304 or the decision at 1310. This is different from, for example, an autocomplete feature associated with a search engine user interface where all of the inputs are taken into consideration.

Returning to step 1302, if it is determined that at least one inactive input affects the active input with respect to a format or content limitation, then at 1350 already-specified values for those inactive inputs that affect the active input with respect to a format or content limitation are obtained. In the second row of Table 1, for example, the already-specified value obtained at step 1350 is admin_email.

At 1352 it is determined, based on the already-specified values, if the active input is limited to certain permitted values. If so, the permitted values bit is set to 1 at 1354. If not, the permitted values bit is set to 0 at 1356.

After setting the permitted values bit at step 1354 or step 1356, it is determined, based on the already-specified values, if the active input is limited to certain permitted formats at 1358. If so, the permitted formats bit is set to 1 at 1360. If not, the permitted formats bit is set to 0 at 1362.

The following figures show some examples of communications which are exchanged with a database. In some embodiments, the exemplary communications are exchanged as part of step 106 in FIG. 1. In some applications, communicating with a database as part of a process to provide real-time guidance is attractive because changes to the database can be immediately reflected in the guidance presented. For example, if a new column is added to the database, that new column can be added to a list of columns which is presented to a user immediately after the column is created. Another benefit is that many databases have a user interface with a robust and complete set of operations and/or instructions for accessing and/or querying the database. This eliminates the need to create some underlying instructions and/or operations to provide real-time guidance.

Figure 14:
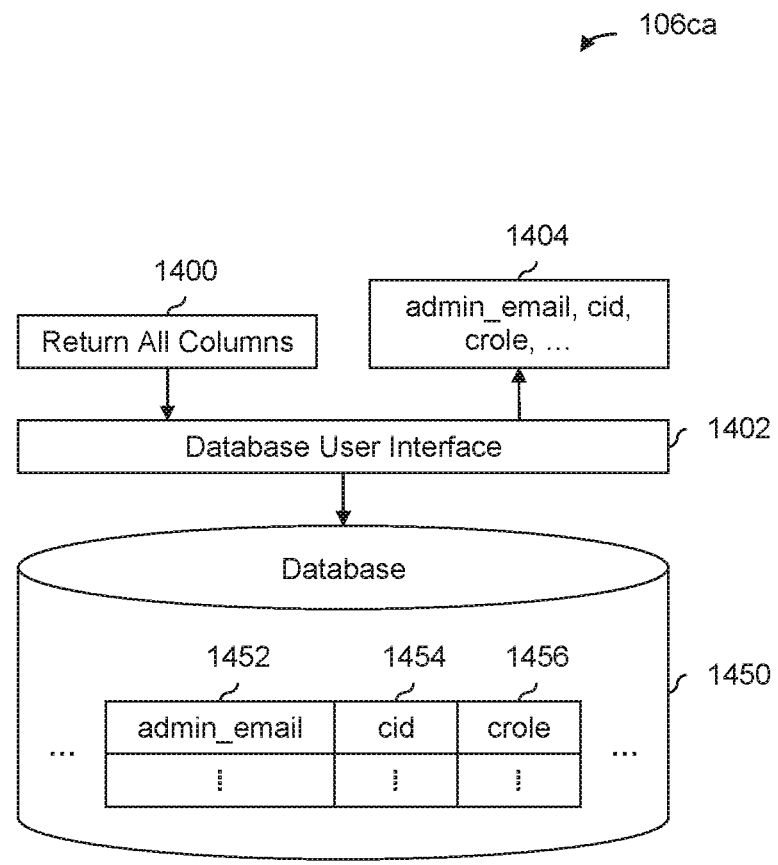
FIG. 14 is a diagram illustrating an embodiment of content assistance related communications which are exchanged with a database user interface.

FIG. 14 is a diagram illustrating an embodiment of content assistance related communications which are exchanged with a database user interface. In some embodiments, the example communications are exchanged during step 106ca in FIG. 4. In the example shown an instruction (1400) to return all columns is sent to database user interface 1402. Database user interface 1402 communicates with database 1450 which includes admin_email column 1452, cid column 1454, crole column 1456, and so on. Database user interface 1402 returns response 1404 which includes the columns admin_email, cid, crole, and so on.

In some embodiments, the columns returned in response 1404 are used to populate a list of columns (or, more generally, a list of permitted values) which are presented in a dropdown box. See, for example, FIG. 5.

Figure 15:
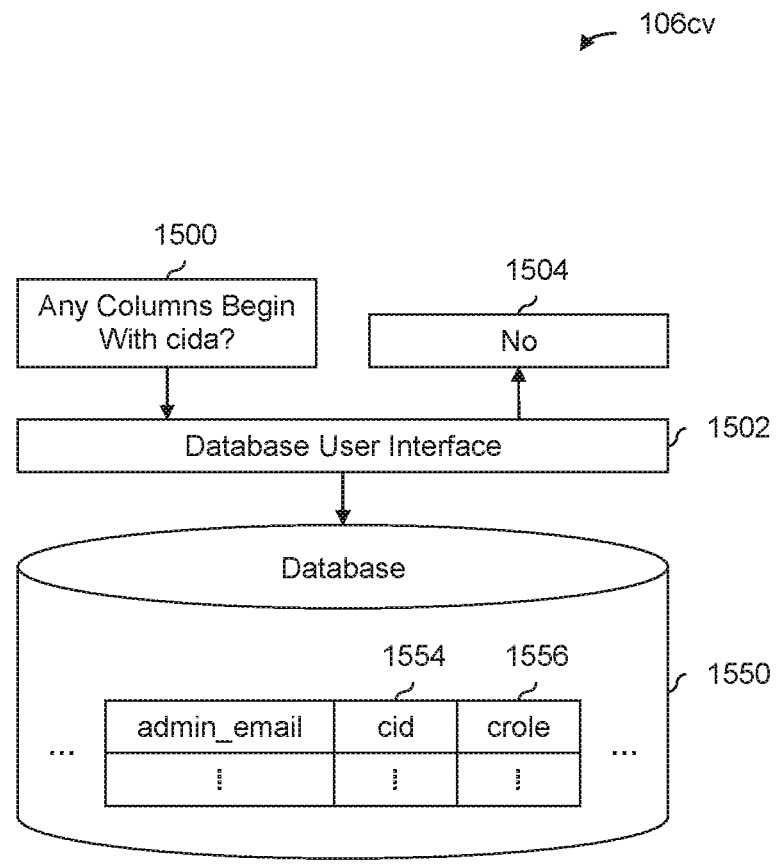
FIG. 15 is a diagram illustrating an embodiment of content verification related communications which are exchanged with a database user interface.

FIG. 15 is a diagram illustrating an embodiment of content verification related communications which are exchanged with a database user interface. In some embodiments, the example communications are exchanged during step 106cv in FIG. 4.

A query (1500) is sent to database user interface 1502 where the query is if any columns begin with cida. For example, query 1500 may includes a wildcard search. Database 1550 shows the columns in alphabetical order and there is no column between cid column 1554 and crole column 1556, meaning that there is no column that begins with cida. A response (1504) is returned by database user interface indicating that there is no column stored by database 1550 which begins with cida.

In some embodiments, the communications shown herein are used to detect that the column cida specified for a second triplet in FIG. 11 violates a context-sensitive rule associated with content.

Figure 16:
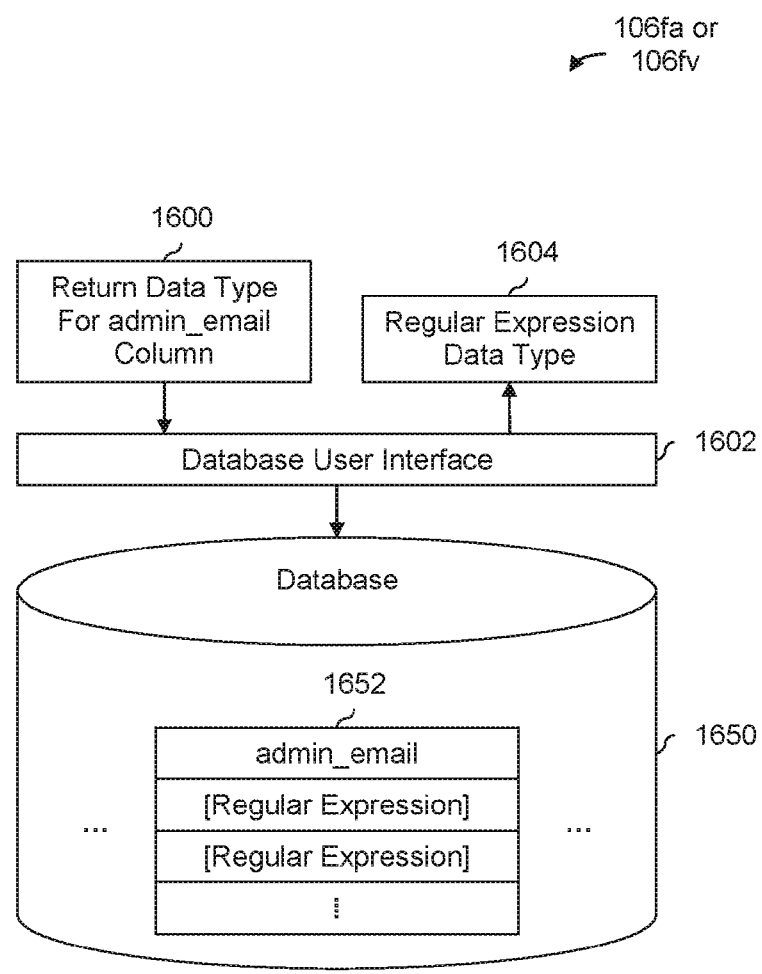
FIG. 16 is a diagram illustrating an embodiment of format assistance and/or format verification related communications which are exchanged with a database user interface.

FIG. 16 is a diagram illustrating an embodiment of format assistance and/or format verification related communications which are exchanged with a database user interface. In some embodiments, the example communications are exchanged during step 106fa and/or step 106fv in FIG. 4.

An instruction (1600) to return the data type for the admin_email column is sent to database user interface 1602. In database 1650, admin_email column 1652 includes one or more regular expressions. For example, when admin_email was created or defined, it could have been assigned a data type of "regular expression." As such, database user interface 1602 returns a response (1604) that the data type is "regular expression."

In one format assistance example, response 1604 causes a user interface to automatically be configured so that a regular expression data type can be entered for the active input. See, for example, FIG. 7 where single quotation marks are automatically inserted and the cursor is automatically placed between the single quotation marks.

In one format verification example, the data type of an active input (where the active input is a value in a triplet) is compared against the data type returned in response 1604 where if the two data types do not match, a context-sensitive rule associated with format is violated. See, for example, FIG. 8.

Figure 17:
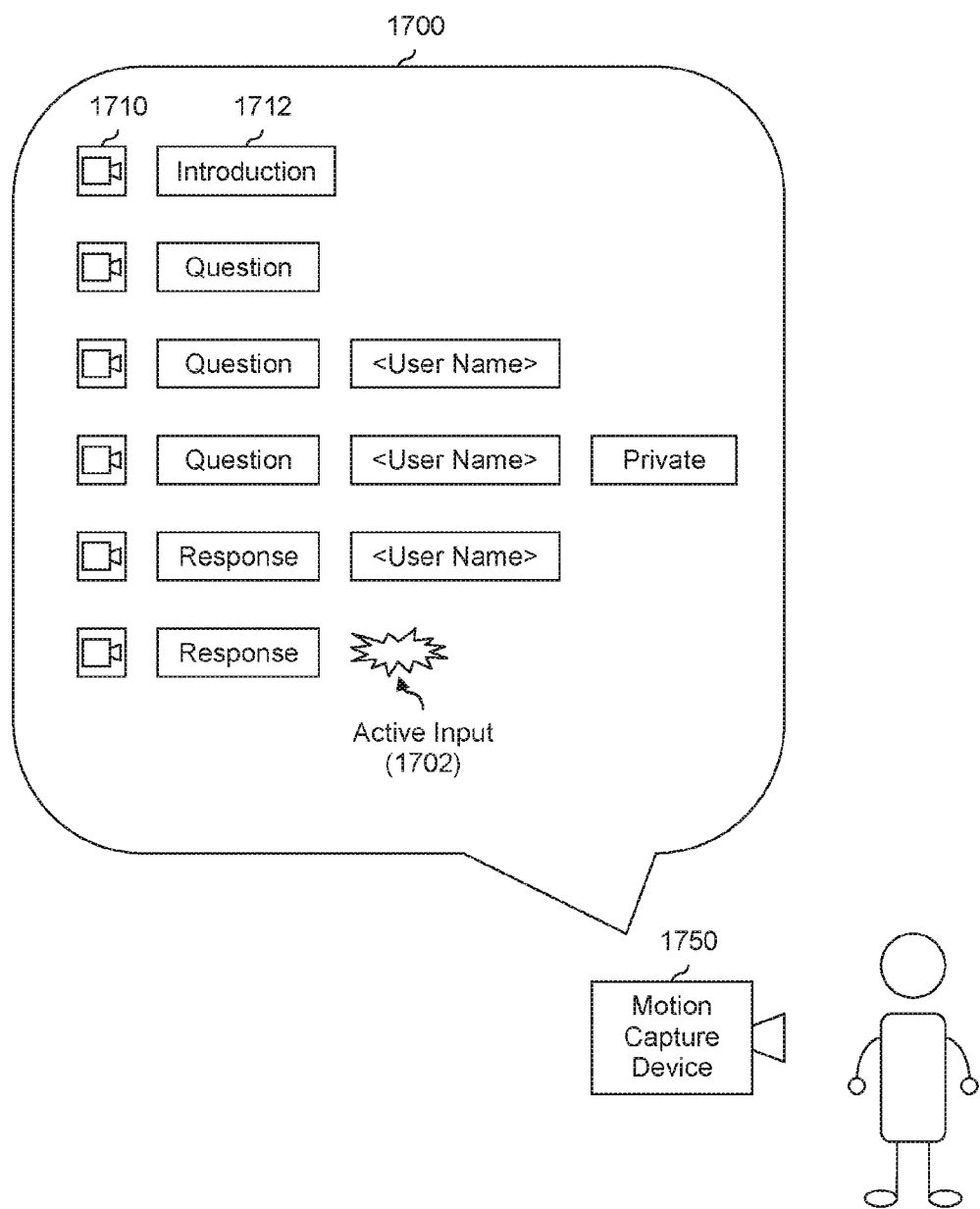
FIG. 17 is a diagram illustrating an embodiment of a user interface associated with a motion capture device which provides guidance in real time.

FIG. 17 is a diagram illustrating an embodiment of a user interface associated with a motion capture device which provides guidance in real time. In the example shown, some of the techniques described above are provided in user interface 1700 which is associated with motion capture device 1750. User interface 1700 is associated with a system via which users can post questions (where if a private flag is set, the question is privately directed to one or more other specified users and if the private flag is not set, anyone can see the question even if it is directed to one or more specified users) and answer questions. Some example systems in which such a user interface is used include social networks, dating websites, and/or telephony/messaging systems.

To interact with user interface 1700, motion capture device 1750 is used. For example, to record a video, the user can either say, "record video" or perform some motion which is recognized as being a motion command associated with recording a video (e.g., the user holds one arm out and claps the other arm down towards the stationary arm to mimic the motion of a clapperboard). Similarly, to navigate through inputs in the user-defined, structured input displayed in user interface 1700, the user may use voice commands and/or motion commands. For example, a user may say, "go left," or do a wrist flick to the left to cause a cursor to move to the left and/or change the active input to be the input to the left of the current active input. This may be in addition to or as an alternative to other input devices (e.g., a keyboard and/or a mouse). Other voice and/or motion commands may relate to insertion (e.g., saying "tag as private" which would cause a tag of private to be inserted at the active input), deletion (e.g., saying "delete" would cause the active input to be deleted), video-related commands (e.g., saying "play" would cause an active input which is a video file to be played back), or otherwise manipulating the active input (e.g., saying "move up" would cause the active input to be moved to the row above).

To enter a name and address in text using voice commands, the following interaction with motion capture device 1750 may be performed. A clapping sound detected by motion capture device 1750 will be interpreted by the system as going to a next photograph or video (e.g., skipping over any tags). Once on the next photograph or video, facial recognition is used to determine the name of a person in a photograph or video. Then, the address of that person is looked up in some database or directory. In some cases, there may be multiple addresses returned for that person (e.g., credit records show multiple previous addresses). If so, in some embodiments, a most recent address is displayed to the user. The name and address (e.g., a most recent address) is displayed to the user, for example in user interface 1700. To reject an address, the user can say, "No." To accept an address, the user can say "Okay." To specify an address (e.g., by spelling out via voice recognition), a user can makes a gesture to indicate they want to spell out the address or say a corresponding voice command and then spell out the address (e.g., "One, Seven, Six, Space, S, O, U, T, H, Space, S, T, R, E, E, T" and so on).

As shown in the above examples, it is possible to enter or otherwise specify text, video, images, and/or other content using the system shown in FIG. 17. A variety of techniques for entering or specifying content (e.g., text, video, images, etc.) may be used, including audible commands, motion based commands, keyboard entry, mouse entry, etc. In some embodiments, validation is performed using a variety of processors and/or techniques, such as facial recognition, database lookup, and so on. In some embodiments, validation is performed by a user (e.g., the user verifies a displayed name, address, or other information is correct and/or acceptable).

One way in which the user-defined, structured input shown in user interface 1700 is structured is that rows indicate groupings. For example, the first row includes a video (1710) and a tag of introduction (1712). The tag 1712 marks or flags video 1710 as being an introductory video, for example, where the user introduces themselves, talks about their interests/hobbies, etc. Video 1710 and tag 1712 in the first row are independent of and not associated with the inputs in the second row, third row, and so on. Other tags shown in user interface 1700 which may be associated with or assigned to a video include: question (e.g., indicating an associated video is a question), user name (e.g., directing a question or a response to the specified user where one or more users may be specified), private (e.g., indicating that an associated video question or video response is to be kept private), and response (e.g., indicated an associated video is an answer).

In one example of content verification, the system has a restriction against swearing or nudity in videos which are publically accessible. For example, a video introduction, video question, and/or video response which includes any swearing or nudity would violate a context-sensitive rule associated with content. Any video tagged with an introduction tag or which does not have a private tag will be verified (e.g., using automated audio and/or video analysis tools) to ensure they do not contain prohibited content. Note that if a private flag is assigned to a video then this context-sensitive rule is not applicable (e.g., based on the context that the video is private) and the check will not be performed.

In one example of format assistance, a video response is expected by the system to be directed to at least one specified user. As such, user interface 1700 may provide format assistance (e.g., by playing an audio file that says "please specify a user to whom this response should be directed") if a video is tagged with the response flag (e.g., as is the case shown in this figure since active input 1702 is in a row with a video response but no user name is specified). Note that the context-sensitive rule is sensitive to context in the sense that it is enforced or triggered by the presence of the response tag. It would not, for example, be enforced or triggered by the presence of the question tag.

In one example of format verification, a private tag cannot be assigned to a video which has already been tagged with an introduction tag. It may not make sense, for example, to make an introduction (which is intended to be globally or publically accessible) private. If those two tags are used together, then user interface 1700 may indicate, in real time, that the combination violates a context-sensitive rule associated with format. Note that the rule is context-sensitive in the sense that it is only enforced or triggered if the introduction tag is used and is not enforced or triggered if (for example) the question flag is used.

In one example of content assistance, a user name is expected for active input 1702 since the video has been tagged as a response and a response must be directed to at least one user. Content assistance may be provided in the form of a grid or slideshow of introductory videos and user names being presented to the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, via an element included in a user interface, a user-defined, structured input;
selecting, in real time, an active input from the user-defined, structured input based at least in part on context associated with the user interface;
using a processor to determine a context-sensitive rule that applies to the active input, wherein:
the context-sensitive rule requires that the active input be a specific data type; and
using the processor to determine the context-sensitive rule includes:
setting one or more of the following: a permitted values bit or a permitted formats bit;
dividing, based at least in part on the active input, inactive inputs from the user-defined, structured input into two groups: (1) those inactive inputs that affect the active input with respect to a format or content limitation and (2) those inactive inputs that do not affect the active input with respect to a format or content limitation;
determining if any inactive inputs affect the active input with respect to a format or content limitation; and
in the event it is determined none of the inactive inputs affect the active input with respect to a format or content limitation:
determining, without taking into consideration any of the inactive inputs, if the active input is limited to certain permitted values; and
determining, without taking into consideration any of the inactive inputs, if the active input is limited to certain permitted formats; and
providing, in real time via the user interface, guidance associated with the active input and the context-sensitive rule, including by performing the following:
displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and
displaying, in the user interface, format validation which indicates whether the context-sensitive rule is satisfied based at least in part on a current data type of the active input.

2. The method of claim 1, wherein the selection of the active input is based at least in part on a position of one or more of the following: a cursor, a visual indicator, a blinking indicator, or a highlighted text.

3. The method of claim 1, wherein the user-defined, structured input includes one or more of the following: a still image, an audio file, or a video file.

4. The method of claim 1, wherein providing guidance includes using one or more of the following: a still image, an audio file, a video file, a CSS style, a hyperlink, a tooltip, a help box, a dropdown box, automatic configuration of the user interface, a highlight, or an error message.

5. The method of claim 1, wherein the specific data type that satisfies the context-sensitive rule includes one or more of the following: a string, an integer, a floating point, a regular expression, or a Boolean.

6. A method, comprising:
receiving, via an element included in a user interface, a user-defined, structured input;
selecting, in real time, an active input from the user-defined, structured input based at least in part on context associated with the user interface;
using a processor to determine a context-sensitive rule that applies to the active input, wherein:
the context-sensitive rule requires that the active input be a specific data type; and
using the processor to determine the context-sensitive rule includes:
setting one or more of the following: a permitted values bit or a permitted formats bit;
dividing, based at least in part on the active input, inactive inputs from the user-defined, structured input into two groups: (1) those inactive inputs that affect the active input with respect to a format or content limitation and (2) those inactive inputs that do not affect the active input with respect to a format or content limitation;
determining if any inactive inputs affect the active input with respect to a format or content limitation; and
in the event it is determined at least one of the inactive inputs affects the active input with respect to a format or content limitation:

obtaining already-specified values for those inactive inputs that affect the active input with respect to a format or content limitation;

determining, based on the already-specified values, if the active input is limited to certain permitted values; and determining, based on the already-specified values, if the active input is limited to certain permitted formats; and providing, in real time via the user interface, guidance associated with the active input and the context-sensitive rule, including by performing the following:

displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and displaying, in the user interface, format validation which indicates whether the context-sensitive rule is satisfied based at least in part on a current data type of the active input.

7. A system, comprising:

a processor; and a memory coupled with the processor, wherein the memory is configured to provide the processor with instructions which when executed cause the processor to:

receive, via an element included in a user interface, a user-defined, structured input;

select, in real time, an active input from the user-defined, structured input based at least in part on context associated with the user interface;

determine a context-sensitive rule that applies to the active input, wherein:

the context-sensitive rule requires that the active input be a specific data type; and the instructions for determining the context-sensitive rule include instructions which when executed cause the processor to:

set one or more of the following: a permitted values bit or a permitted formats bit;

divide, based at least in part on the active input, inactive inputs from the user-defined, structured input into two groups: (1) those inactive inputs that affect the active input with respect to a format or content limitation and (2) those inactive inputs that do not affect the active input with respect to a format or content limitation;

determine if any inactive inputs affect the active input with respect to a format or content limitation; and in the event it is determined none of the inactive inputs affect the active input with respect to a format or content limitation:

determine, without taking into consideration any of the inactive inputs, if the active input is limited to certain permitted values; and determine, without taking into consideration any of the inactive inputs, if the active input is limited to certain permitted formats; and provide, in real time via the user interface, guidance associated with the active input and the context-sensitive rule, including by performing the following:

displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and displaying, in the user interface, format validation which indicates whether the context-sensitive rule is satisfied based at least in part on a current data type of the active input.

8. The system of claim 7, wherein the specific data type that satisfies the context-sensitive rule includes one or more of the following: a string, an integer, a floating point, a regular expression, or a Boolean.

9. A system, comprising:

a processor; and a memory coupled with the processor, wherein the memory is configured to provide the processor with instructions which when executed cause the processor to:

receive, via an element included in a user interface, a user-defined, structured input;

select, in real time, an active input from the user-defined, structured input based at least in part on context associated with the user interface;

determine a context-sensitive rule that applies to the active input, wherein:

the context-sensitive rule requires that the active input be a specific data type; and the instructions for determining the context-sensitive rule include instructions which when executed cause the processor to:

set one or more of the following: a permitted values bit or a permitted formats bit;

divide, based at least in part on the active input, inactive inputs from the user-defined, structured input into two groups: (1) those inactive inputs that affect the active input with respect to a format or content limitation and (2) those inactive inputs that do not affect the active input with respect to a format or content limitation; and determine if any inactive inputs affect the active input with respect to a format or content limitation; and in the event it is determined at least one of the inactive inputs affects the active input with respect to a format or content limitation:

obtain already-specified values for those inactive inputs that affect the active input with respect to a format or content limitation;

determine, based on the already-specified values, if the active input is limited to certain permitted values; and determine, based on the already-specified values, if the active input is limited to certain permitted formats; and provide, in real time via the user interface, guidance associated with the active input and the context-sensitive rule, including by performing the following:

displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and displaying, in the user interface, format validation which indicates whether the context-sensitive rule is satisfied based at least in part on a current data type of the active input.

10. A computer program product, the computer program product being embodied in a non-transitory computer readable storage medium and comprising computer instructions for:
- receiving, via an element included in a user interface, a user-defined, structured input;
- selecting, in real time, an active input from the user-defined, structured input based at least in part on context associated with the user interface;
- determining a context-sensitive rule that applies to the active input, wherein:
  - the context-sensitive rule requires that the active input be a specific data type; and
  - the computer instructions for determining the context-sensitive rule include computer instructions for:
    - setting one or more of the following: a permitted values bit or a permitted formats bit:
      - dividing, based at least in part on the active input, inactive inputs from the user-defined, structured input into two groups: (1) those inactive inputs that affect the active input with respect to a format or content limitation and (2) those inactive inputs that do not affect the active input with respect to a format or content limitation;
      - determining if any inactive inputs affect the active input with respect to a format or content limitation; and
      - in the event it is determined none of the inactive inputs affect the active input with respect to a format or content limitation:
        - determining, without taking into consideration any of the inactive inputs, if the active input is limited to certain permitted values; and
        - determining, without taking into consideration any of the inactive inputs, if the active input is limited to certain permitted formats; and
- providing, in real time via the user interface, guidance associated with the active input and the context-sensitive rule, including by performing the following:
  - displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and
  - displaying, in the user interface, format validation which indicates whether the context-sensitive rule is satisfied based at least in part on a current data type of the active input.

11. The computer program product of claim 10, wherein the specific data type that satisfies the context-sensitive rule includes one or more of the following: a string, an integer, a floating point, a regular expression, or a Boolean.

12. A computer program product, the computer program product being embodied in a non-transitory computer readable storage medium and comprising computer instructions for:
- receiving, via an element included in a user interface, a user-defined, structured input;
- selecting, in real time, an active input from the user-defined, structured input based at least in part on context associated with the user interface;
- determining a context-sensitive rule that applies to the active input, wherein:
  - the context-sensitive rule requires that the active input be a specific data type; and
  - the computer instructions for determining the context-sensitive rule include computer instructions for:
    - setting one or more of the following: a permitted values bit or a permitted formats bit:
      - dividing, based at least in part on the active input, inactive inputs from the user-defined, structured input into two groups: (1) those inactive inputs that affect the active input with respect to a format or content limitation and (2) those inactive inputs that do not affect the active input with respect to a format or content limitation;
      - determining if any inactive inputs affect the active input with respect to a format or content limitation; and
      - in the event it is determined at least one of the inactive inputs affects the active input with respect to a format or content limitation:
        - obtaining already-specified values for those inactive inputs that affect the active input with respect to a format or content limitation;
        - determining, based on the already-specified values, if the active input is limited to certain permitted values; and
        - determining, based on the already-specified values, if the active input is limited to certain permitted formats; and
- providing, in real time via the user interface, guidance associated with the active input and the context-sensitive rule, including by performing the following:
  - displaying, in the user interface, format assistance which includes one or more of the following: (1) identification of the specific data type that satisfies the context-sensitive rule or (2) automatic configuration of the user interface so that the active input has a data type which matches the specific data type that satisfies the context-sensitive rule; and
  - displaying, in the user interface, format validation which indicates whether the context-sensitive rule is satisfied based at least in part on a current data type of the active input.

* * * * *